United States Patent
Lee

(10) Patent No.: US 7,889,311 B2
(45) Date of Patent: Feb. 15, 2011

(54) APPARATUS FOR TESTING LIQUID CRYSTAL DISPLAY PANEL

(75) Inventor: Seung-Bum Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 15 days.

(21) Appl. No.: 12/385,513

(22) Filed: Apr. 9, 2009

(65) Prior Publication Data
US 2009/0201458 A1 Aug. 13, 2009

Related U.S. Application Data

(62) Division of application No. 11/477,798, filed on Jun. 30, 2006, now Pat. No. 7,535,548.

(30) Foreign Application Priority Data

Dec. 29, 2005 (KR) ...................... 10-2005-0134590

(51) Int. Cl.
*G02F 1/13* (2006.01)
*G01R 31/00* (2006.01)
(52) U.S. Cl. ...................... 349/192; 324/770
(58) Field of Classification Search ................ 324/770
See application file for complete search history.

(56) References Cited

U.S. PATENT DOCUMENTS

| | | | | |
|---|---|---|---|---|
| 4,789,224 | A * | 12/1988 | Bougsty | 349/65 |
| 5,734,158 | A * | 3/1998 | Nagashima et al. | 250/225 |
| 6,232,616 | B1 * | 5/2001 | Chen et al. | 250/559.45 |
| 7,027,123 | B2 * | 4/2006 | Chae et al. | 349/192 |
| 7,092,067 | B2 * | 8/2006 | Kweon et al. | 349/187 |
| 7,227,374 | B2 * | 6/2007 | Kang et al. | 324/770 |
| 7,426,022 | B2 * | 9/2008 | Oka | 356/218 |
| 7,440,072 | B2 * | 10/2008 | Park et al. | 349/158 |
| 7,449,223 | B2 * | 11/2008 | Kawamura et al. | 428/1.3 |

FOREIGN PATENT DOCUMENTS

| | | | | |
|---|---|---|---|---|
| JP | 08179251 | A * | 7/1996 | |
| JP | 2000-10064 | | 1/2000 | |
| JP | 2000010064 | A * | 1/2000 | |
| JP | 2003-75792 | | 3/2003 | |
| JP | 2003075792 | A * | 3/2003 | |

* cited by examiner

*Primary Examiner*—Michelle R Connelly Cushwa
(74) *Attorney, Agent, or Firm*—McKenna Long & Aldridge LLP

(57) ABSTRACT

An apparatus for testing a liquid crystal display (LCD) panel which is capable of easily attaching or detaching a large polarizer to/from a test board when testing a large LCD panel, the apparatus comprising a test board for outputting light to an LCD panel which is placed thereon, a polarizer fixing unit rotatably formed at the test board and having a groove in which a polarizer is inserted, and a stop formed at the test board to fix the polarizer fixing unit to a desired position.

10 Claims, 4 Drawing Sheets

APPARATUS FOR TESTING LIQUID CRYSTAL DISPLAY PANEL

CROSS-REFERENCE TO RELATED APPLICATIONS

This application is a Divisional of application Ser. No. 11/477,798 filed Jun. 30, 2006 now U.S. Pat. No. 7,535,548, now allowed; which claims priority to Korean Patent Application No. 10-2005-0134590, filed Dec. 29, 2005 all of which are hereby incorporated by reference for all purposes as if fully set forth herein.

BACKGROUND OF THE INVENTION

1. Field of the Invention

The present invention relates to an apparatus for testing a liquid crystal display panel, and particularly, to an apparatus for testing a liquid crystal display panel which is capable of easily fixing a polarizer having a large size by inserting the polarizer into a rotatable polarizer fixing unit.

2. Discussion of the Related Art

With the continuing deployment of various portable electric devices such as mobile phones, personal digital assistants (PDA), notebook computers, various types of flat panel display devices such as liquid crystal displays (LCDs), plasma display panels (PDPs), field emission displays (FEDs), and vacuum florescent displays (VFDs), having a compact construction, light weight, and low power-consumption characteristics are being developed. LCDs are extensively used because they are drivable with relatively simple circuitry and because of their superior ability to display images.

The liquid crystal display (LCD) device takes advantage of the refractive index anisotropy of liquid crystal to display information on a screen. As shown in FIG. 1, a typical LCD device 1 includes a lower substrate 5, an upper substrate 3, and a liquid crystal layer 7 disposed between the lower substrate 5 and the upper substrate 3. The lower substrate 5 is a switching device array substrate. Although not shown, the lower substrate 5 is provided with a plurality of pixels, each of which is provided with a switching device such as a Thin Film Transistor (TFT). The upper substrate 3 is a color filter substrate and includes a color filter layer for implementing a substantial color. In addition, the lower substrate 5 and the upper substrate 3 are respectively provided with a pixel electrode and a common electrode and are each coated with an alignment layer for aligning liquid crystal molecules of the liquid crystal layer 7.

The lower and upper substrates 5 and 3 are bonded to each other by a sealant 9. The liquid crystal layer 7 is formed between the lower and upper substrates 5 and 3. A driving device applies potentials to the pixel and common electrodes to control using the switching device formed at the lower substrate 5 to control the orientation of the liquid crystal molecules and accordingly to control an amount of light transmitted through the liquid crystal layer 7 to display images.

A fabrication process of the LCD device includes a switching device array substrate forming process for forming the switching devices at the lower substrate 5, a color filter forming process for forming the color filter at the upper substrate 3, and a cell forming process. The fabricating process of the LCD device will now be explained with reference to FIG. 2.

First, as part of the switching device array forming process, a plurality of gate lines and a plurality of data lines are arranged on the lower substrate 5 to define pixel regions. A TFT to be used as a switching device is connected to each gate line and each data line and is formed in each pixel region (S101). The switching device array forming process further includes forming a pixel electrode connected to the TFT to drive the liquid crystal layer 7 when a signal is applied via the TFT.

The color filter forming process include forming a color filter layer for implementing R, G and B colors on the upper substrate 3, and a forming common electrode thereon (S104).

An alignment layer is coated on each of the upper and lower substrate 3 and 5. The alignment layers are rubbed to provide an alignment controlling force or a surface fixing force to set the initial alignment (i.e., a pretilt angle and an alignment direction) of the liquid crystal molecules of the liquid crystal layer 7 disposed between the upper and lower substrates 3 and 5 (S102 and S105). Spacers are dispersed over the lower substrate 5 for maintaining a cell gap between the upper and lower substrates 3 and 5 and a sealant 9 is disposed on an outer periphery of the upper substrate 3 for bonding together the lower substrate 5 and the upper substrate by applying a pressure thereto (S103, S106 and S107). The lower and upper substrates 5 and 3 are formed from large sized glass substrates. In other words, a plurality of panel regions are formed on the large glass substrates and the TFT (i.e., the switching device) and the color filter layer are formed on each panel region. Accordingly, the glass substrate must be cut and processed in order to fabricate unit LCD panels (S108). A liquid crystal may be injected into the processed unit LCD panels through a liquid crystal injection opening and then the injection opening is encapsulated to form the liquid crystal layer 7. Each unit LCD panel is inspected to complete the fabrication process of the LCD panel (S109 and S110).

The LCD panel is typically tested (inspected) by a visual inspection and an electrical lighting test. The lighting test is performed by applying a signal to a completely fabricated LCD panel to detect (test) whether various electric devices are operating normally, while the visual inspection is performed by an operator conducting a naked eye inspection of the LCD panel to determine whether the LCD panel has been defectively fabricated.

A typical apparatus for visually inspecting an LCD panel includes a test board having a lamp therein for outputting light. An LCD panel is transferred to the visual inspection apparatus to be placed on the test board and a polarizer is positioned on the LCD panel. A signal is applied to the LCD panel and the LCD panel is illuminated by light transmitted from the lamp provided in the test board. The operator observes light transmitted through the LCD panel to detect defects in the LCD panel.

FIGS. 3A and 3B show a related art visual inspection apparatus for testing an LCD panel appearance, wherein FIG. 3A is a side sectional view of the visual inspection apparatus and FIG. 3B is a plane view thereof.

As shown in FIGS. 3A and 3B, a related art apparatus for visually inspecting an LCD panel 20 includes a test board 22 including a lamp installed therein for transmitting light to the LCD panel 1 placed thereon; a camera 24 positioned at an upper portion of the test board 22 for capturing alignment marks (not shown) formed at an outer periphery of the LCD panel 1 to thus determine whether the LCD panel 1 has been aligned on the test board 22; a jig 32 disposed at a lower portion of the test board 22 supporting a polarizer 30 and having holes 27; and a plurality of jig pins 26 formed at the test board 22 to be inserted into the holes 27 of the jig 32 to thus fix the jig 32 to the test board 22, thereby fixing the polarizer 30 onto the LCD panel 1.

The test board 22 is inclined by about 60° relative to the ground and has a lamp therein. When an operator puts the LCD panel 1 on the test board 22, the camera 24 captures the alignment marks formed on the LCD panel 1 to provide information regarding the state of alignment of the LCD panel 1. With the LCD panel 1 aligned on the test board 22, the operator inserts the jig pins 26 formed at the test board 22 into the holes 27 formed in the jig 32 to position the polarizer 30 on the LCD panel 1. With the polarizer fixed, a signal is applied to the LCD panel 1 and a transmissivity of light transmitted through the LCD panel is changed according to a signal applied to the LCD panel 1. The operator observes the light transmitted through the polarizer 30 to evaluate the quality of the LCD panel.

The jig 32 supports the polarizer 30. The operator manipulates the jig 32 rather than the polarizer 30 to position the polarizer 30 on the test board 22. The jig pins 26 are inserted into the holes 27 formed in the jig 32 to fix the jig 32, and thus the polarizer 30, onto the test board 22.

However, the above described visual inspection apparatus for the LCD panel may generate problems as follows.

In order to fix the polarizer 30 by inserting the jig 32 into the jig pins 26, the operator must manually hold the jig 32 while inserting the jig pins 26 of the test board 22 into the holes 27 of the jig 32. However, with a the large-sized LCD panel 1, the corresponding large size of the polarizer 30 makes it physically difficult or impossible for the operator to manually insert the jig pins 26 into the holes 27 of the jig 32. In addition, while attaching or detaching the polarizer 30, the polarizer 30 may strike the camera 24, resulting in damage to the camera 24 or to the polarizer 30.

SUMMARY OF THE INVENTION

Accordingly, the present invention is directed to an apparatus for testing liquid crystal display panel that substantially obviates one or more of the problems due to limitations and disadvantages of the related art.

An advantage of the present invention is to provide an apparatus for testing a liquid crystal display panel that is capable of easily attaching and detaching a polarizer by inserting a polarizer jig into a groove formed in a polarizer fixing unit to fix the polarizer.

Another advantage of the present invention is to provide an apparatus for testing a liquid crystal display panel in which a polarizer fixing unit is rotatably constructed to be then perpendicularly inserted into a polarizer, and then the polarizer fixing unit is rotated to position the polarizer on an LCD panel, thereby preventing the polarizer from colliding with other components.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for testing a liquid crystal display (LCD) panel includes: a test board to transmit light to an LCD panel which is placed thereon; a polarizer fixing unit rotatably formed at the test board and having a groove into which a polarizer is insertable; and a stop formed at the test board to fix the polarizer fixing unit at a predetermined position.

In another aspect of the present invention, an apparatus for testing a liquid crystal display (LCD) panel includes: a test board to transmit light to an LCD panel which is placed thereon; a jig to support a polarizer, and a polarizer fixing unit formed at the test board and having a groove into which the jig is insertable to thus fix the polarizer.

In another aspect of the present invention, a method of fabricating a liquid crystal display (LCD) panel, the method includes: preparing a first and a second substrate; performing a switching device array process on the first substrate; performing a color filter substrate process on the second substrate; bonding the first and second substrate together; forming a liquid crystal layer between the substrates; cutting the attached substrates into a plurality of unit LCD panels; performing a visual inspection of a unit LCD panel of the plurality of unit LCD panels using a visual inspection apparatus including: a test board to transmit light to a unit LCD panel disposed thereon; a polarizer fixing unit rotatably formed at the test board and having a groove into which a polarizer is insertable; and a stop formed at the test board to fix the polarizer fixing unit at a predetermined position.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Hereinafter, an apparatus for testing an appearance of an LCD panel according to the present invention will now be explained in detail with reference to the attached drawings.

Figure 1:
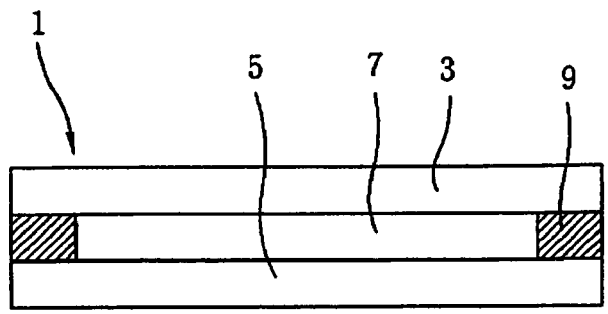
FIG. 1 is a sectional view showing a typical LCD device.
Figure 2:
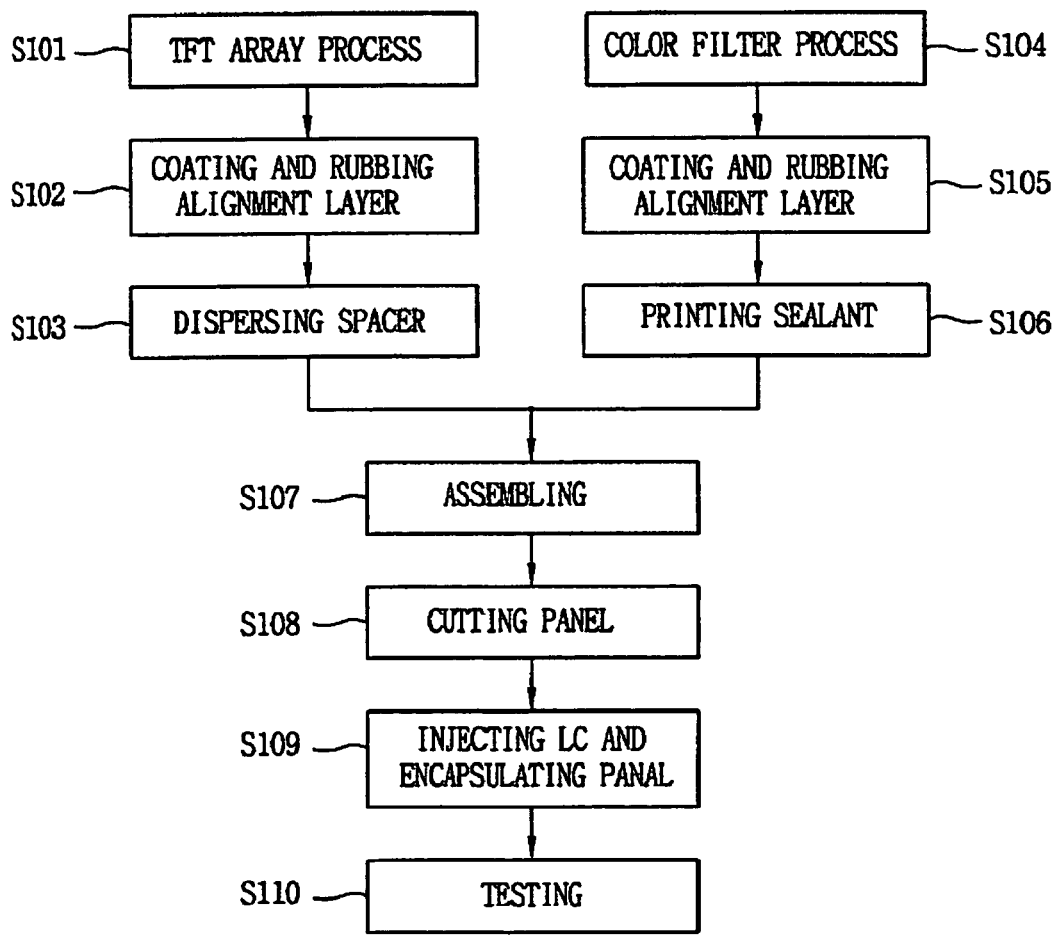
FIG. 2 is a flowchart showing a related art method for fabricating an LCD device.
Figure 3A:
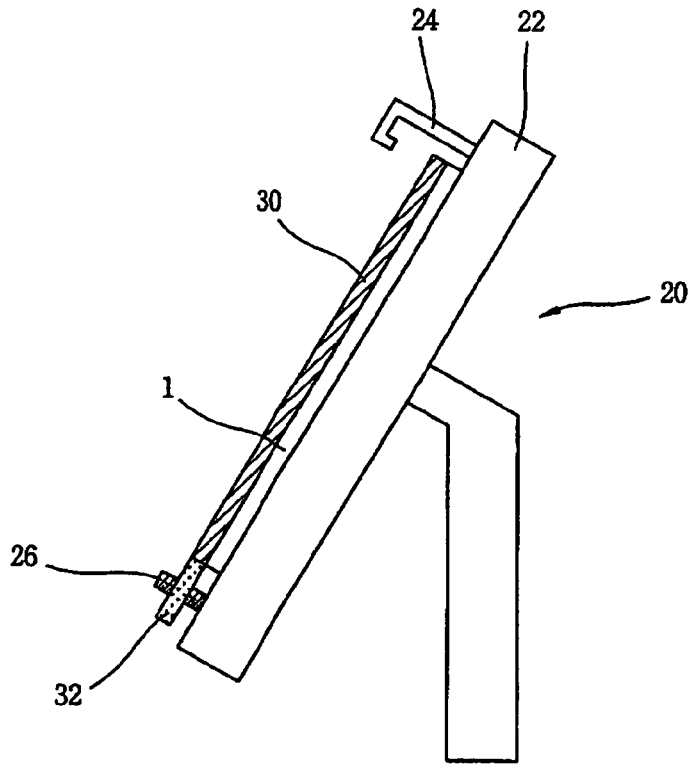
FIGS. 3A and 3B are views showing a related art apparatus for testing an appearance of an LCD panel.
Figure 3B:
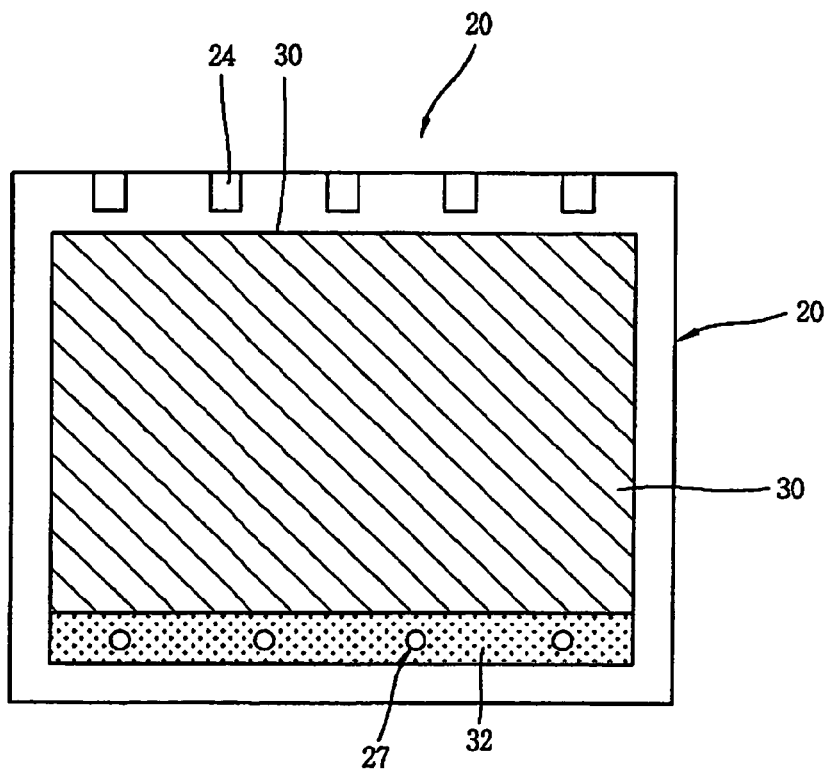
Figure 4A:
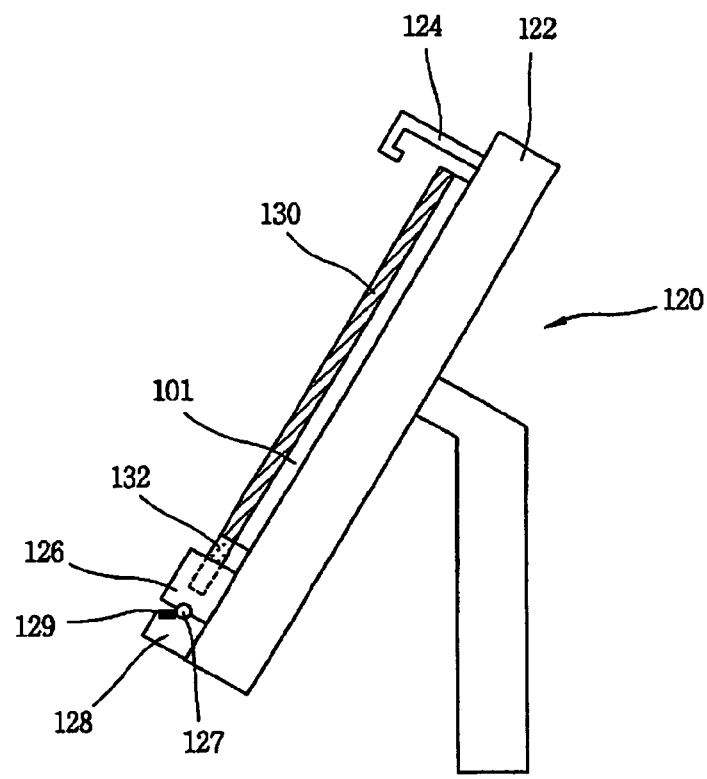
FIGS. 4A and 4B are views showing an apparatus for testing an appearance of an LCD panel according to an embodiment of the present invention.
Figure 4B:
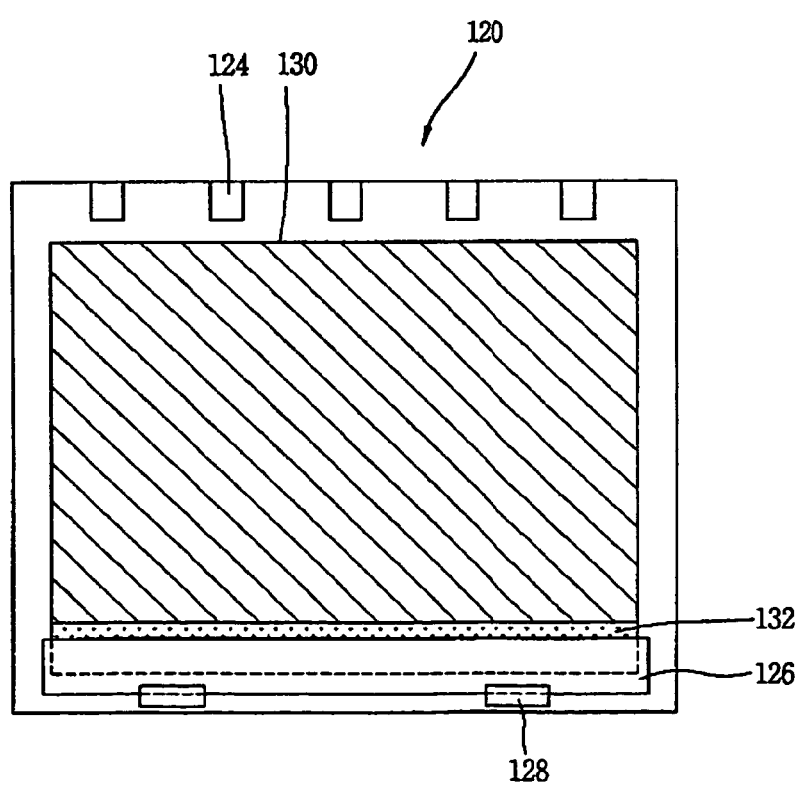

FIGS. 4A and 4B are views showing an apparatus for testing an appearance of an LCD panel according to the present invention. As shown in FIGS. 4A and 4B, an apparatus 120 for visual inspection of an LCD panel according to an embodiment of the present invention includes a test board 122 for transmitting light to an LCD panel 101 placed thereon by use of a lamp installed therein; a jig 132 for supporting a polarizer 130; and a polarizer fixing unit 126 formed at the test board 122 and in which the jig 132 is inserted.

The polarizer fixing unit 126 is provided such that the jig 132 for supporting the polarizer 130 is inserted thereinto. An inserting groove for the polarizer 130 is formed in the polarizer fixing unit 126 and accordingly the jig 132 of the polarizer 130 is inserted into the inserting groove to fix the polarizer 130. The polarizer fixing unit 126 is rotatable about a rotary shaft 127 to form a certain angle from the test board 122. For example, the polarizer fixing unit 126 may be rotatable to be perpendicular to the ground. The polarizer 130 can easily be inserted into the inserting groove of the polarizer fixing unit 126 when the polarizing fixing unit is rotated downwardly to a certain angle such as in a perpendicular direction to the ground.

Furthermore, the test board 122 is provided with a stop 128 for setting the rotation angle of the polarizer fixing unit 126. The polarizer fixing unit 126 may be rotated to a position where the polarizer 130 can easily be inserted therein. Over-rotation of the polarizer fixing unit 126 makes it more difficult to insert the polarizer 130 therein. Accordingly, the stop 128 is provided to stop the rotation of the polarizer fixing unit 126 at a position where the polarizer 130 may be easily inserted therein.

The stop 128 may include a fixing member 129 such as a magnet. The fixing member 129 maintains the polarizing fixing unit 126 positioned at the insertion position of the polarizer 130, and accordingly holds the polarizer fixing unit 126 while the polarizer 130 is inserted into the polarizer fixing unit 126. A unit for coupling to the fixing member 129 may be provided to fix the polarizing fixing unit 126 to the fixing member 129. For example, when the fixing member 129 is the magnet, a ferrous metal plate may be provided on the polarizer fixing unit 126 to fix the polarizer fixing unit 126 at the desired position by a magnetic force of the magnet. Alternatively, when the fixing member 129 is a bolt, the polarizer fixing unit 126 may have a nut threadable onto the bolt to fix the polarizer fixing unit at the desired position. The fixing member 129 may be disposed in the polarizer fixing unit 126 and the unit for coupling to the fixing member 129 may be disposed in the stop 128.

Figure 5A:
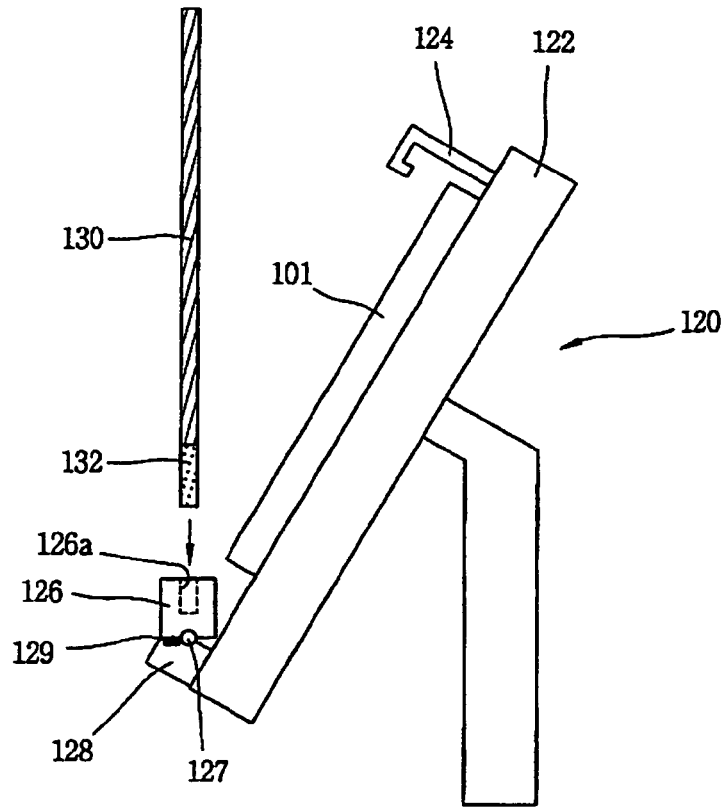
FIGS. 5A and 5B are views showing an operation of the apparatus for testing an appearance of an LCD panel according to an embodiment of the present invention.
Figure 5B:
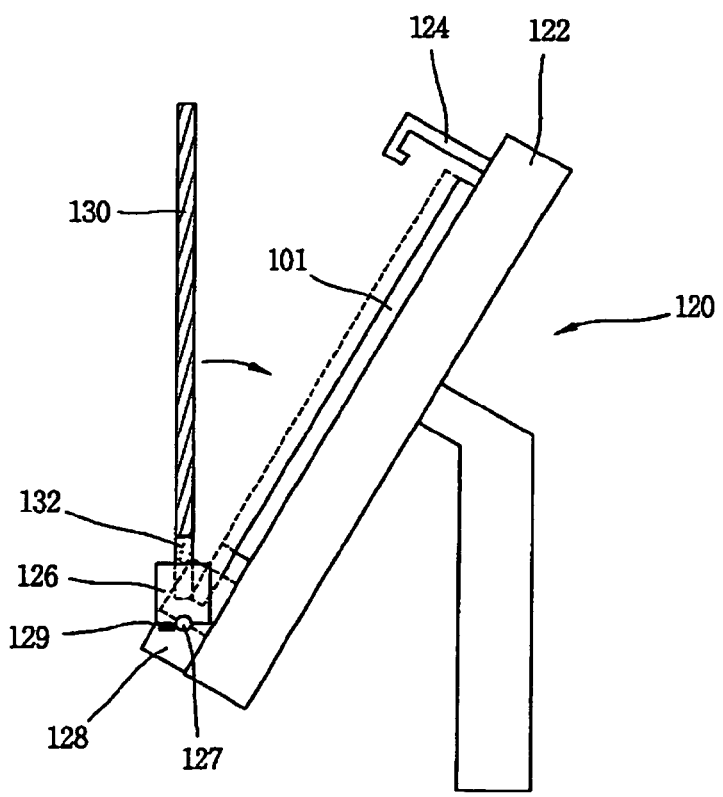

A method for testing an LCD panel using the apparatus for visually inspecting the LCD panel having such construction will now be explained with reference to FIGS. 5A and 5B.

First, a switching device array forming process is performed to form gate lines and data lines, thin film transistors, and a pixel electrode on a first substrate and a color filter forming process is performed to form a color filter layer and a common electrode on a second substrate. A cell forming process is performed to bond the first and second substrates. Various methods such as a vacuum injection method or a liquid crystal dispensing method are adapted to form a liquid crystal layer between the first and second substrates. The LCD panel 101 that has undergone the switching device array forming process, the color filter forming process and the cell forming process is transferred to a visual inspection appearance testing process by a transferring apparatus such as a conveyer. The transferred LCD panel 101 is placed on the test board 122. As shown in FIG. 5A, the polarizer fixing unit 126 is rotated to allow a groove 126a formed in the polarizer fixing unit 126 to be positioned upwardly. At this time, the polarizer fixing unit 126 is fixed to the stop 128 by the fixing member 129, to thus maintain the groove 126a positioned upwardly by being at an angle to the ground such as perpendicular to the ground.

An operator then inserts the polarizer 130 that is supported by the jig 132 downwardly into the groove 126a of the polarizer fixing unit 126 to fix the polarizer 130. Then, as shown in FIG. 5B, the polarizer fixing unit 126 is rotated to position the polarizer 130 on the LCD panel 101.

With the polarizer 130 positioned on the LCD panel 101, the camera 124 is used to confirm the aligned state of the LCD panel 101. A signal is applied to the LCD panel 101 and the operator then observes light transmitted through the polarizer 130 to detect whether the LCD panel 101 has a defect.

As described above, the apparatus for testing an appearance of the LCD panel according to the present invention can be constructed such that the groove in which the jig is inserted is formed in the polarizer fixing unit which is rotatable whereby a polarizer having a large size can easily be positioned on the LCD panel and also a collision of the polarizer with the camera or other component can effectively be prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for testing a liquid crystal display (LCD) panel comprising:
    a test board to transmit light to an LCD panel that is placed thereon;
    a polarizer fixing unit rotatably formed at the test board and having a groove into which a polarizer is insertable; and
    a stop formed at the test board to fix the polarizer fixing unit at a predetermined position.

2. The apparatus of claim 1, wherein the polarizer fixing unit is rotatable to position the groove substantially perpendicular to a ground.

3. The apparatus of claim 1, further comprising a fixing member installed at one of the polarizer fixing unit and the stop to fix the polarizer fixing unit.

4. The apparatus of claim 3, wherein the fixing member includes a magnet.

5. The apparatus of claim 1, further comprising a camera disposed at an upper portion of the test board to capture the LCD panel to determine an aligned state of the LCD panel.

6. The apparatus of claim 1, further comprising a jig insertable into the polarizing fixing unit to support the polarizer.

7. The apparatus of claim 1, further comprising a rotational shaft to rotate the polarizer fixing unit.

8. An apparatus for testing a liquid crystal display (LCD) panel comprising:
    a test board to transmit light to an LCD panel that is placed thereon;
    a jig to support a polarizer; and
    a polarizer fixing unit formed at the test board and having a groove into which the jig is insertable to fix the polarizer,
    wherein the polarizer fixing unit is rotatable to an angle at which the groove is perpendicular to a ground to thus insert the jig into the groove.

9. The apparatus of claim 8, further comprising a rotational shaft to rotate the polarizer fixing unit.

10. The apparatus of claim 8, further comprising:
    a stop for stopping the rotation of the polarizer fixing unit; and
    a fixing member for fixing the rotated polarizer fixing unit.

* * * * *